United States Patent [19]

Sugahara et al.

[11] 3,818,025
[45] June 18, 1974

[54] PROCESS FOR THE RAPID PRODUCTION OF 2-MERCAPTOBENZOTHIAZOLE

[75] Inventors: Makoto Sugahara, Nishinomiya; Kenjiro Mori, Takarazuka; Morisue Nagata, Osaka, all of Japan

[73] Assignee: Sumitomo Chemical Company, Limited, Osaka-shi, Osaka-fu, Japan

[22] Filed: Apr. 29, 1971

[21] Appl. No.: 138,818

[52] U.S. Cl. .............................................. 260/306
[51] Int. Cl............................................ C07d 91/48
[58] Field of Search .................................... 260/306

[56] References Cited
UNITED STATES PATENTS

| | | | |
|---|---|---|---|
| 1,865,477 | 7/1932 | Messer | 260/306 |
| 1,915,955 | 6/1933 | Schlosser et al. | 260/306 |
| 2,247,894 | 7/1941 | Smith | 260/306 |

Primary Examiner—Richard J. Gallagher
Attorney, Agent, or Firm—Craig and Antonelli

[57] ABSTRACT

In the production of 2-mercaptobenzothiazole by the reaction of aniline, carbon disulfide and sulfur at a high temperature under an elevated pressure, a process which is characterized in that the reaction is carried out first at 250° to 300° C and then at 200° to 240° C. By such process, 2-mercaptobenzothiazole is produced in an excellent yield with a high productivity.

10 Claims, No Drawings

PROCESS FOR THE RAPID PRODUCTION OF 2-MERCAPTOBENZOTHIAZOLE

The present invention relates to an improved process for production of 2-mercaptobenzothiazole.

As well known, 2-mercaptobenzothiazole is useful as a vulcanization accelerator for natural and synthetic rubbers. It is also useful as the starting material in the production of thiazole compounds which can be employed as vulcanization accelerators.

Among various processes for production of 2-mercaptobenzothiazole proposed in the past, the one comprising the reaction of aniline, carbon disulfide and sulfur at a high temperature under an elevated pressure has heretofore been recognized to be the most advantageous.

When the said reaction takes a relatively long time, the once produced 2-mercaptobenzothiazole is decomposed to form tar. Since this tendency becomes remarkable with the elevation of the reaction temperature, a higher yield of the product is obtained in case of carrying out the reaction at a lower temperature. However, such temperature decreases the reaction rate as seen in most and ordinary chemical reactions. Thus, a lower reaction temperature results in a higher yield but takes a longer time to attain the highest yield so that the production amount per the units of the capacity of the reaction apparatus and of the reaction time is smaller. In other words, the adoption of a lower reaction temperature requires a larger capacity of the reaction apparatus, which is accompanied by a higher cost.

On the other hand, a higher reaction temperature can give a higher production amount per the units of the capacity of the reaction apparatus and of the reaction time but is disadvantageously accompanied by a lower yield. Thus, the simultaneous satisfaction in the yield and the productivity could not be attained.

As the result of the study on the said process, it has been found that the execution of the reaction in two steps, i.e., first at a temperature from 250° to 300° C and then at a temperature from 200° to 240° C, affords 2-mercaptobenzothiazole in a good yield with a high productivity. Although a number of proposals have been made for the production of 2-mercaptobenzothiazole, such execution of the reaction in two steps has never been proposed.

According to the present invention, the reaction of aniline, carbon disulfide and sulfur is carried out first at a higher temperature, i.e., from 250° to 300° C, then at a lower temperature, i.e., from 200° to 240° C.

The reaction may be effected batchwise or continuously. As the shortening of the reaction time results necessarily in the increase of the productivity, the continuous execution is generally preferred.

In case of the batch procedure, the reaction is first effected at the higher temperature for a certain period of time and, after lowering the temperature, then executed at the lower temperature for another certain period of time.

In case of the continuous procedure, the starting materials are fed into a reaction apparatus having a first reaction zone maintained at the higher temperature and a second reaction zone maintained at the lower temperature.

As the reaction apparatus, there may be employed various types of reactors including tank, tower and tube reactors. For instance, the combined use of a tube reactor as the first reaction zone and a tank or tube reactor as the second reaction zone is suitable for the continuous procedure. Further, for instance, the use of a tube reactor of which the length is 100 times or more of the diameter is extremely favorable. Carbon disulfide and sulfur are each used in an equimolar or small excess amount to aniline. The reaction is conducted under a pressure of first 50 to 150 kg/cm$^2$ and then 20 to 100 kg/cm$^2$ in the batch procedure and under a pressure below 150 kg/cm$^2$, favorably 40 to 100 kg/cm$^2$ in the continuous procedure. The reaction time in the first stage depends on the reaction temperature but is usually from 10 minutes to 3 hours and the reaction time in the second stage depends on the time and temperature in the first stage but is usually from 10 minutes to 15 hours.

Practical and presently preferred embodiments of the present invention are shown in the following Examples.

EXAMPLE 1

In a 500 ml volume autoclave equipped with an agitator, aniline (139.5 g), carbon disulfide (114 g) and sulfur (48 g) are charged, and the reaction is carried out at 260° C for 1 hour and then at 220° C for 1 hour. The reaction mixture is dissolved in aqueous solution of sodium hydroxide and insoluble materials are filtered off. Air is blown into the filtrate whereby impurities are separated. Then, the filtrate is treated with an acid to separate 2-mercaptobenzothiazole. Yield, 88 percent.

When the reaction is effected at 260° C in a single step, the highest yield attained 2 hours from the initiation of the reaction is 82 percent. When the reaction is effected at 220° C, the highest yield is 88 percent but can be attained only after 10 hours.

From the above, it is understood that the same results can be obtained by the process of this invention only in a reaction time of 1/5. Thus, the productivity in the two step process of this invention is five times that in the conventional single step process.

EXAMPLE 2

There is used a reaction apparatus consisting of two reactors arranged in order, one of the reactors being a tube reactor of 15 mm in inner diameter, 50 m in length and 8.8 L in capacity for the first reaction zone and the other being a tank reactor of 17.6 L in capacity for the second reaction zone. The reaction is effected at 280° C in the first reaction zone and at 240° C in the second reaction zone. Aniline and 30.9 percent carbon disulfide solution of sulfur are continuously fed into the reaction apparatus respectively with a rate of 4.5 kg/hr and of 6.25 kg/hr (sulfur, 1.93 kg/hr; carbon disulfide, 4.32 kg/hr). The presumed average retention time is 1 hour in the first reaction zone and 2 hours in the second reaction zone. The reaction product is purified as in Example 1 to give 2-mercaptobenzothiazole in 85 percent yield.

EXAMPLE 3

A reaction apparatus consisting of two tube reactors of 15 mm in inner diameter, 50 m in length and 8.8 L in capacity is used. The temperatures at the first reactor and at the second reactor are respectively 260° C and 220° C. Aniline, carbon disulfide and sulfur are continuously fed into the first reactor with a rate of 4.5 kg/hr, of 3.95 kg/hr and of 1.77 kg/hr. The presumed average retention time is 1 hour in both of the first and second reactors. The reaction product is purified as in Example 1 to give 2-mercaptobenzothiazole in 88 percent yield.

When the reaction is effected at 240° C in a single step, an yield of 88 percent is gained with a retention time of 6 hours.

From the above, it is understood that the same results can be obtained by the process of this invention only in a retention time of 2 hours. Thus, the productivity in the two step process of this invention is three times that in the conventional single step process.

What is claimed is:

1. In a process for producing 2-mercaptobenzothiazole in which aniline, carbon disulfide and sulfur are mixed together, the improvement comprising maintaining the temperature of the mixture so obtained under an elevated pressure at 250° to 300° C for at least 10 minutes, and thereafter maintaining the temperature of said mixture at 200° to 240° C for at least 10 minutes to produce 2-mercaptobenzothiazole, wherein the total time of the reaction is no more than 3 hours.

2. The precess according to claim 1, wherein the reaction is carried out continuously.

3. The process according to claim 1, wherein the reaction is carried out using a reaction apparatus consisting of two reactors arranged in order, the inner temperatures of the first reactor and of the second reactor being respectively maintained at a temperature from 250° to 300° C and at a temperature from 200° to 240° C.

4. The process according to claim 3, wherein the first reactor is a tube reactor of which the length is 100 times or more of the diameter.

5. The process according to claim 1, wherein the reaction is carried out continuously using a reaction apparatus consisting of two reactors arranged in order, the inner temperatures of the first reactor and of the second reactor being respectively maintained at a temperature from 250° to 300° C and at a temperature from 200° to 240° C and at least one of the reactors being a tube reactor of which the length is 100 times or more of the diameter.

6. The process according to claim 1, wherein the reaction is carried out batchwise.

7. The process according to claim 1 wherein the carbon disulfide and sulfur are present in equimolar or small excess amount to the aniline.

8. The process according to claim 1, wherein the process is carried out batch-wise and under a pressure of first 50 to 150 kg/cm² and then 20 to 100 kg/cm².

9. The process according the claim 2, wherein the pressure is below 150 kg/cm².

10. The process according to claim 2, wherein the pressure is from 40 to 100 kg/cm².

* * * * *